United States Patent

Byrne et al.

[11] Patent Number: 5,995,396
[45] Date of Patent: Nov. 30, 1999

[54] HYBRID STANDBY POWER SYSTEM, METHOD OF OPERATION THEREOF AND TELECOMMUNICATIONS INSTALLATION EMPLOYING THE SAME

[75] Inventors: Vincent M. Byrne; Marco A. Davila, both of Mesquite; Edward C. Fontana, Rockwall; Yehoshua Mandelcorn; Steven C. Stein, both of Dallas; Pradhuman S. Zaveri, Plano, all of Tex.

[73] Assignee: Lucent Technologies Inc., Murray Hill, N.J.

[21] Appl. No.: 09/268,917

[22] Filed: Mar. 15, 1999

Related U.S. Application Data

[63] Continuation of application No. 08/991,497, Dec. 16, 1997.
[51] Int. Cl.[6] .............................. H02M 5/42; H02J 9/00; H01M 10/44
[52] U.S. Cl. .......................... 363/89; 363/95; 320/103; 307/86
[58] Field of Search .................................. 363/89, 87, 65, 363/95, 134, 26; 307/64, 87, 86, 265, 68; 320/103; 438/681

[56] References Cited

U.S. PATENT DOCUMENTS

| | | | |
|---|---|---|---|
| 4,460,618 | 7/1984 | Gottfried | 438/681 |
| 5,070,251 | 12/1991 | Rhodes et al. | 307/46 |
| 5,621,299 | 4/1997 | Krall | 320/103 |

*Primary Examiner*—Shawn Riley
*Assistant Examiner*—Rajnikant B. Patel

[57] ABSTRACT

A hybrid standby power system for producing regulated DC electrical power, a method of producing such power and a telecommunications installation that employs either the system or the method. In one embodiment, the system includes: (1) a primary power input, couplable to a primary power source, that accepts primary electrical power subject to interruption, (2) a standby power input, couplable to a standby power source, that accepts unregulated standby electrical power and (3) a power converter, couplable to at least one of the primary and standby power inputs, including a rectifier that rectifies at least one of the primary and standby electrical power to provide unregulated DC electrical power and a DC—DC converter that converts the unregulated DC electrical power into the regulated DC electrical power.

20 Claims, 7 Drawing Sheets

HYBRID STANDBY POWER SYSTEM, METHOD OF OPERATION THEREOF AND TELECOMMUNICATIONS INSTALLATION EMPLOYING THE SAME

This is a continuation of U.S. patent application Ser. No. 08/991,497, filed on Dec. 16, 1997, entitled "HYBRID STANDBY POWER SYSTEM, METHOD OF OPERATION THEREOF AND TELECOMMUNICATIONS INSTALLATION EMPLOYING THE SAME" to Byrne, et al., which is incorporated herein by reference.

TECHNICAL FIELD OF THE INVENTION

The present invention is directed, in general, to standby power systems employing power conversion and, more specifically, to a hybrid standby power system, a method of providing standby power and a telecommunications installation that employs the hybrid standby power system or the method.

BACKGROUND OF THE INVENTION

Particularly in the field of telecommunications, it is desirable to have an alternate, or "standby," power source if a primary power source is lost or becomes unreliable. Typical telecommunications facilities rely on commercial utilities as a primary source of power. A standby power source may take the form of, for example, a flywheel or an electrical generator driven by a fuel-powered engine.

Many types of standby power sources are available, including turbines, micro-turbines, rotary engines, and internal combustion engines. The selection of a particular type of standby power source requires consideration of not only the load requirements, but the available space to house the device and the maintenance requirements; unfortunately, in most applications, a compromise is required in an attempt to select a system having the best possible overall features and advantages. For example, many low-speed, high-torque devices are available that are governed to 3600 r.p.m., which can be used to generate a 60 Hz output. A low operating speed, however, translates into high-torque, which results in a large motor size. Because it is typically desired to house standby systems in very small areas, such as a cellular antenna facility, a large motor size is at the least undesirable, and possibly impracticable. Moreover, low-speed devices also typically require periodic maintenance. The foregoing disadvantages assoicated with the use of low-speed devices is, this, driving the trend in standby power systems toward the use of high-speed devices.

In recent years, many advanced, high-speed electrical generators or flywheels have been developed. The use of these newer high-speed devices is desirable because they are smaller in size than comparably rated low-speed devices, they are generally expensive, and they are typically low-maintenance. A design disadvantage of smaller size and higher r.p.m., however, is the difficulty or impracticability of designing a device capability of directly outputting 60 Hz power.

Conventional telecommunications systems are designed to operate from a source of 60 Hertz alternating current ("AC"), such as that provided by commercial utility systems; such systems also typically require a relatively stable input voltage. Modern, high-speed electrical generators and flywheels, however, typically provide raw output voltages that are both variable and at relatively high frequencies (e.g., 500 to 3000 Hz). Thus, conventional telecommunications system installations employing advanced, low-maintenance electrical generators or flywheels as a standby power source have required the use of a power conditioner. A power conditioner is a device that accepts a raw AC input voltage and provides a well-regulated output. If the raw output voltage of the standby power source is not at the desired operating voltage, the power conditioner must provide AC to AC voltage conversion; if the frequency of the raw output voltage is not at the nominal frequency of the primary source of power, e.g., 60 Hz, the power conditioner must additionally provide frequency conversion.

Conventional telecommunications system installations having a standby power source also employ a transfer switch; when the primary, or commercial, power source is lost, the transfer switch is used to disconnect the commercial power source and thereafter to connect the standby power source to the load. The transfer switch conventionally provides an open, or break-before-make, transition between the two power sources. More specifically, the transfer switch disconnects the initial commercial power source before connecting the alternate power source to the load. The open transition switching avoids any potential surges that may occur as a result of the two unsynchronized sources applying power to the load simultaneously.

The use of power conditioners and transfer switches in conventional standby power systems has several disadvantages. First, both devices are subject to failure, which may result, for example, in the loss of services provided by the telecommunications systems receiving power from a standby power system. Second, both devices may require periodic maintenance, which increases the cost of providing telecommunications services. Third, the cost of installing a standby power system is much greater than if the use of power conditioners and/or transfer switches were not required. Fourth, space is often limited in many applications, thus weighing against the use of or need for a power conditioner and/or a transfer switch.

Accordingly, what is needed in the art is a standby power system, and method of operation thereof, that provides more reliable operation, and reduced costs of installation and maintenance. Additionally, there is a need in the art for a telecommunications installation employing a high-rotational-speed (e.g. , greater thatn 3600 r.p.m.)standby power system that does not require the use of a power conditioner and/or a transfer switch.

SUMMARY OF THE INVENTION

To address the above-described deficiencies of the prior art, the present invention provides a hybrid standby power system for producing regulated electrical power, a method of producing such power and a telecommunications installation that employs either the system or the method. In one embodiment, the system includes: (1) a primary power input, couplable to a primary power source, that accepts primary electrical power that is subject to interruption, (2) a standby power input, couplable to a standby power source, that accepts unregulated standby electrical power and (3) a power converter, couplable to at least one of the primary and standby power inputs, including a rectifier that rectifies at least one of the primary and standby electrical power to provide unregulated DC electrical power and a DC—DC converter that converts the unregulated DC electrical power into regulated DC electrical power.

The present invention therefore introduces a hybrid standby power system that dispenses with the need for a first-stage AC—AC converter, or "power conditioner," with all of its attendant costs and inefficiencies, including space and power dissipation. Instead, the present invention employs a power converter that is able to accept input electrical power over a substantially wider voltage and frequency range and convert the input electrical power into the regulated DC output. The present invention thus takes advantage of only a low-incremental-cost modification to a conventional power converter, which is already required to process power received from a primary power source, e.g., 60 Hz utility power, to allow the power converter to also process unregulated, or "wild," AC power from a standby power source, thereby eliminating the need for a power conditioner. The elimination of the need for a power conditioner improves the operational efficiency of the system and reduces capital installation costs.

In one embodiment of the present invention, the system further comprises a transfer switch, coupled to the primary and standby power inputs and the power converter, that selectively couples one of the primary and standby power inputs to the power converter. In an alternative embodiment, the power converter includes first and second mutually-isolated power inputs, the first power input coupled to the primary power input and the second power input coupled to the standby power input. Thus, the present invention can operate with or without a transfer switch. In the embodiment lacking a transfer switch, the primary and standby power inputs can accept both primary and unregulated standby electrical power in parallel.

In one embodiment of the present invention, the standby electrical power is variable frequency. In a related embodiment, the standby electrical power is variable voltage. In a more specific embodiment, the standby electrical power is provided by an engine- or flywheel-driven generator, which provides so-called "wild" AC electrical power having both a frequency and a voltage that depend upon the speed of the generator.

In one embodiment of the present invention, the power converter further includes an electromagnetic interference (EMI) filter coupled to the rectifier. Those skilled in the art are familiar with the design and function of EMI filters. The present invention can employ such filters to prevent noise generated by the power converter from being coupled back onto the AC input lines.

In one embodiment of the present invention, the rectifier is a full-bridge diode rectifier; those skilled in the art are familiar with other rectifier topologies. The principles of the present invention are not limited, however, to the use of a rectifier, but may also be used to advantage with power converters employing active rectifiers.

In one embodiment of the present invention, the DC—DC converter is a boost converter; other DC—DC converter topologies, however, are within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
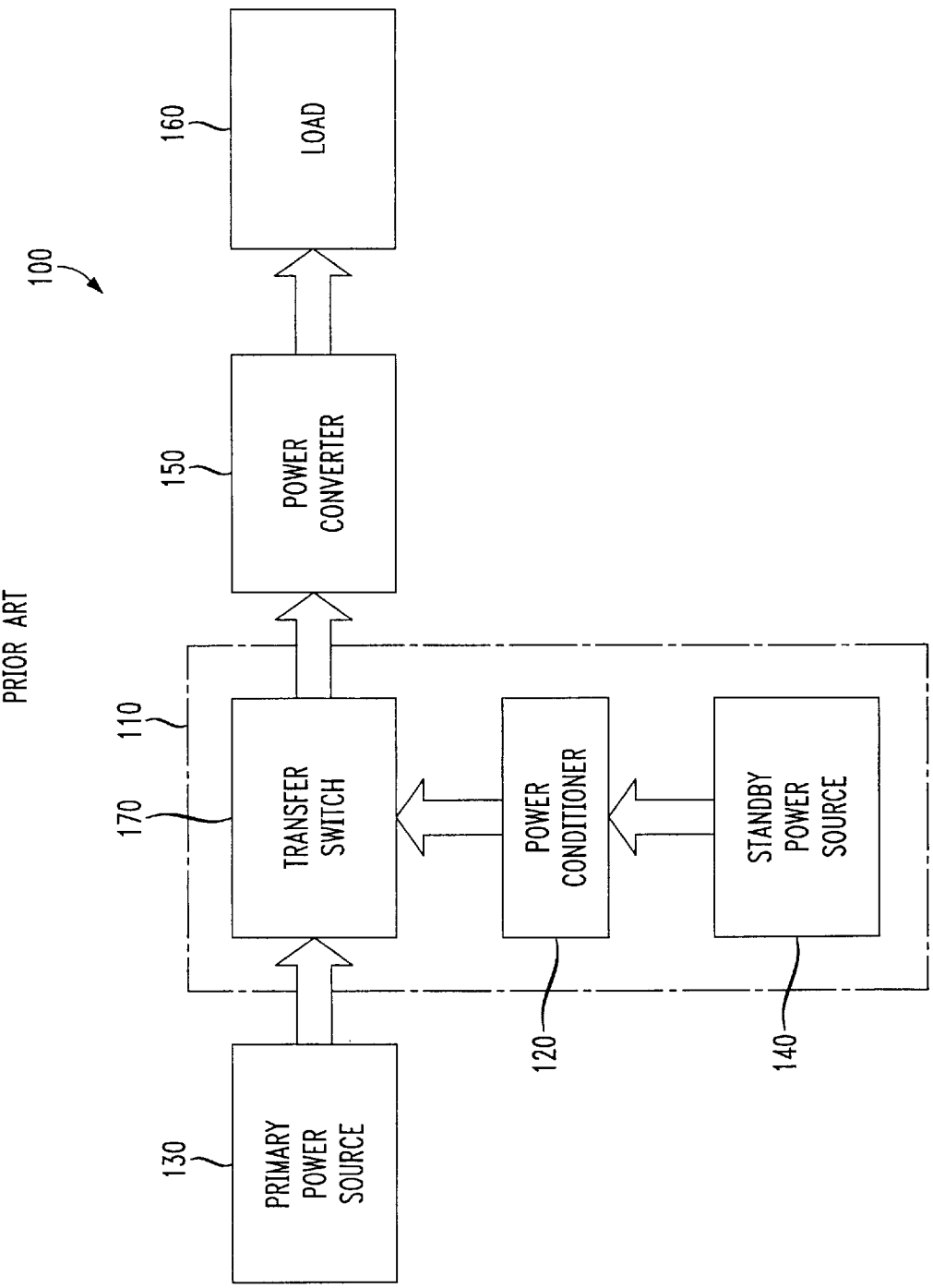
FIG. 1 illustrates a block diagram of a conventional telecommunications installation having a standby power system employing a power conditioner.

Referring initially to FIG. 1, illustrated is a block diagram of a conventional telecommunications installation 100 having a standby power system 110. The telecommunications installation 100 includes a conventional power converter 150 that is adapted to receive an AC input voltage at 60 Hz and provide a well-regulated DC output voltage to a load 160, which may be, for example, switching equipment or cellular communications transceivers. The standby power system 110 includes a standby power source 140, which may be an electrical generator, a power conditioner 120, and a transfer switch 170.

During normal operation, the transfer switch 170 couples the primary power source 130, such as a commercial utility, to the input of the power converter 150. If the primary power source 130 fails, the transfer switch 170 decouples the primary power source 130 from the input of the power converter 150 and couples the output of the power conditioner 120 to the power converter 150. As noted hereinabove, if the standby power source 140 is a high-speed electrical generator, a power conditioner is conventionally used to provide both voltage regulation and frequency conversion so that a well-regulated AC voltage at 60 Hz is provided to the input of the power converter 150.

Figure 2:
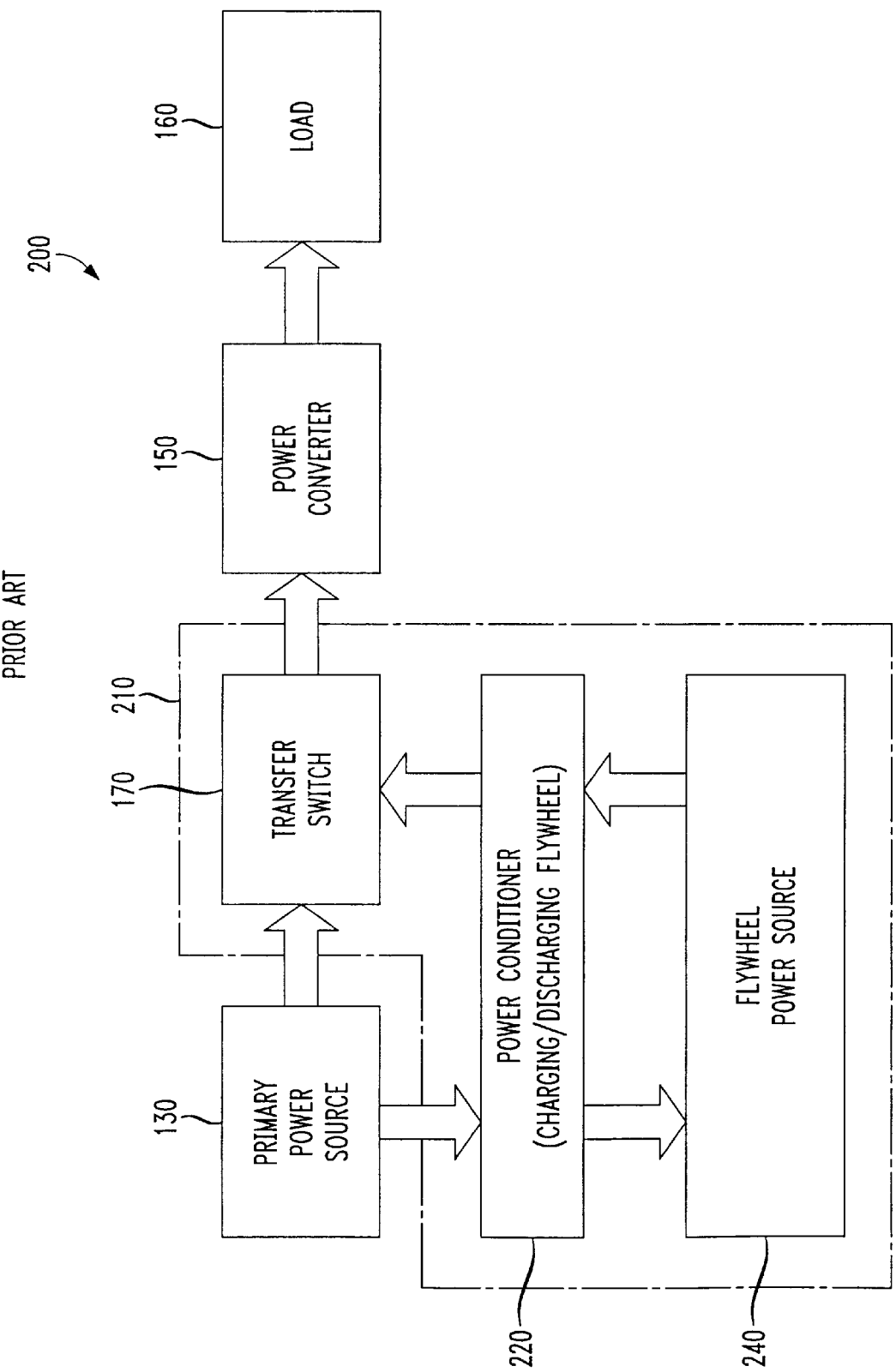
FIG. 2 illustrates a block diagram of a conventional telecommunications installation having a standby power system employing a power conditioner and a flywheel power source.

Turning now to FIG. 2, illustrated is a block diagram of a conventional telecommunications installation 200 employing a standby power system 210. The telecommunications installation 200 is identical to that illustrated in FIG. 1 with the exception that the standby power system 210 employs a flywheel power source 240 as a standby power source and the power conditioner 220 includes circuitry for controlling the charging and discharging of the flywheel power source.

During normal operation of the standby power system 210, the transfer switch 170 couples the primary power source 130, such as a commercial utility, to the input of the power converter 150; the power conditioner 220 also receives electrical power from the primary power source 130, which is used to charge the flywheel power source 240. If the primary power source 130 fails, the transfer switch 170 decouples the primary power source 130 from the input of the power converter 150 and couples the output of the power conditioner 220 to the power converter 150. As noted hereinabove, if the standby power source is a flywheel, a power conditioner is conventionally used to provide both voltage regulation and frequency conversion so that a well-regulated AC voltage at 60 Hz is provided to the input of the conventional power converter 150.

Figure 3:
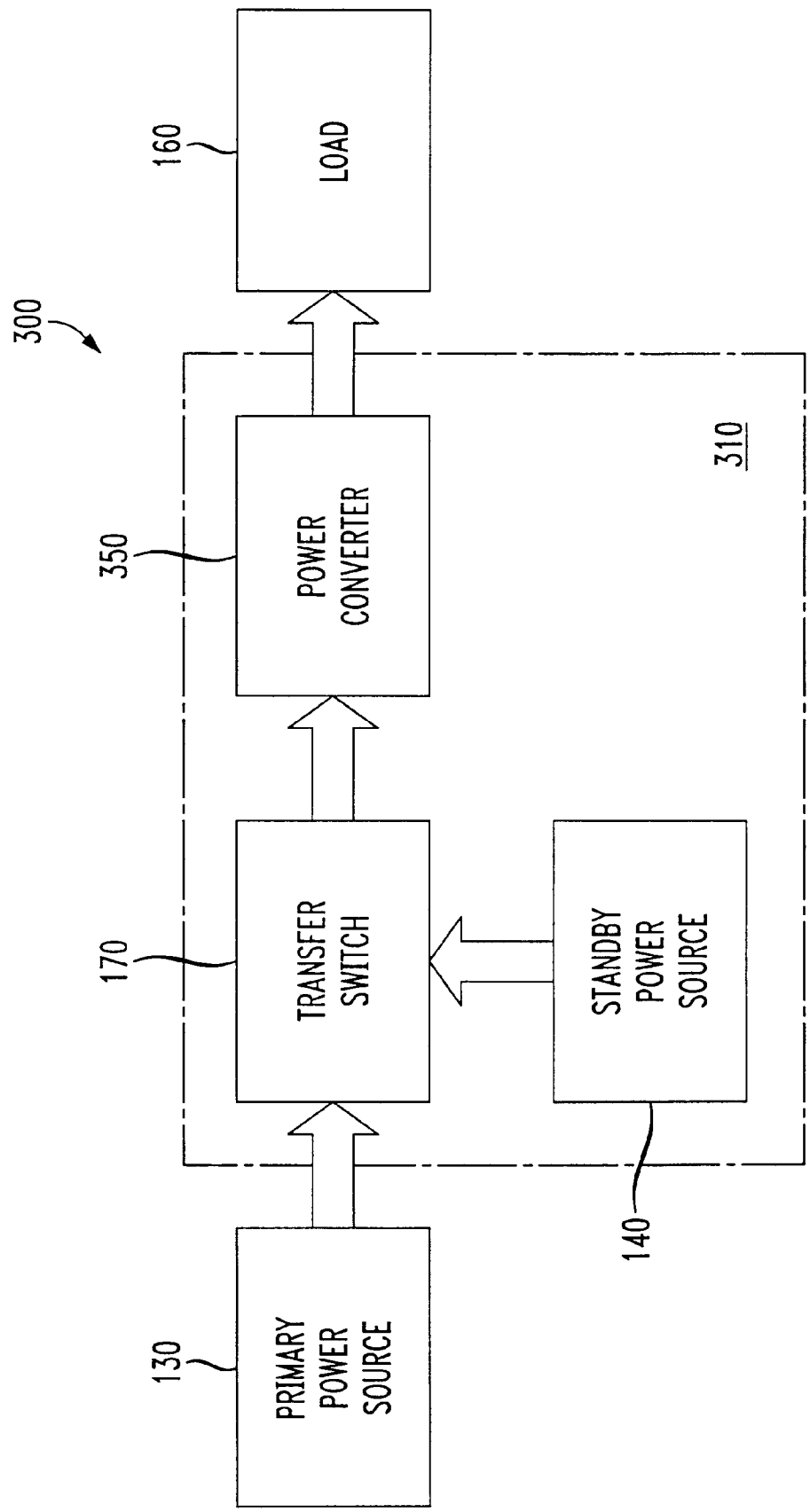
FIG. 3 illustrates a block diagram of a telecommunications installation employing a first embodiment of a hybrid standby power system, constructed according to the principles of the present invention, in which a transfer switch is employed to select between primary and standby-power sources.

Turning now to FIG. 3, illustrated is a block diagram of a telecommunications installation 300 employing a first embodiment of a hybrid standby power system 310, constructed according to the principles of the present invention, in which a transfer switch 170 is employed to select between primary and standby power sources. The design of the hybrid standby power system 310 is predicated on the recognition that it is possible to design a power converter 350, described more fully hereinafter, that is capable of providing a well-regulated DC output voltage to a load 160 over a wide range of input voltages and frequencies. The power converter 350 is designed to accept unregulated AC input voltages over a range of frequencies that includes the normal operating frequencies of both the primary power source 130 and the standby power source 140. For example, if the primary power source 130 is a commercial utility operating at 60±5 Hz and the standby power source 140 is an electrical generator having an output frequency of 500±100 Hz, the power converter 350 is preferably designed to operate over an input frequency range of 55 to 600 Hz.

During normal operation of the hybrid standby power system 310, the transfer switch 170 couples the primary power source 130, such as a commercial utility, to the input of the power converter 350. If the primary power source 130 fails, the transfer switch 170 decouples the primary power source 130 from the input of the power converter 350 and directly couples the standby power source 140 thereto. Thus, by designing the power converter 350 to operate over a substantially-wider input operating range, including both voltage and frequency, than a conventional power converter, the hybrid standby power system 310 has the advantage of not requiring a power conditioner for the output of the standby power source 140.

Figure 4:
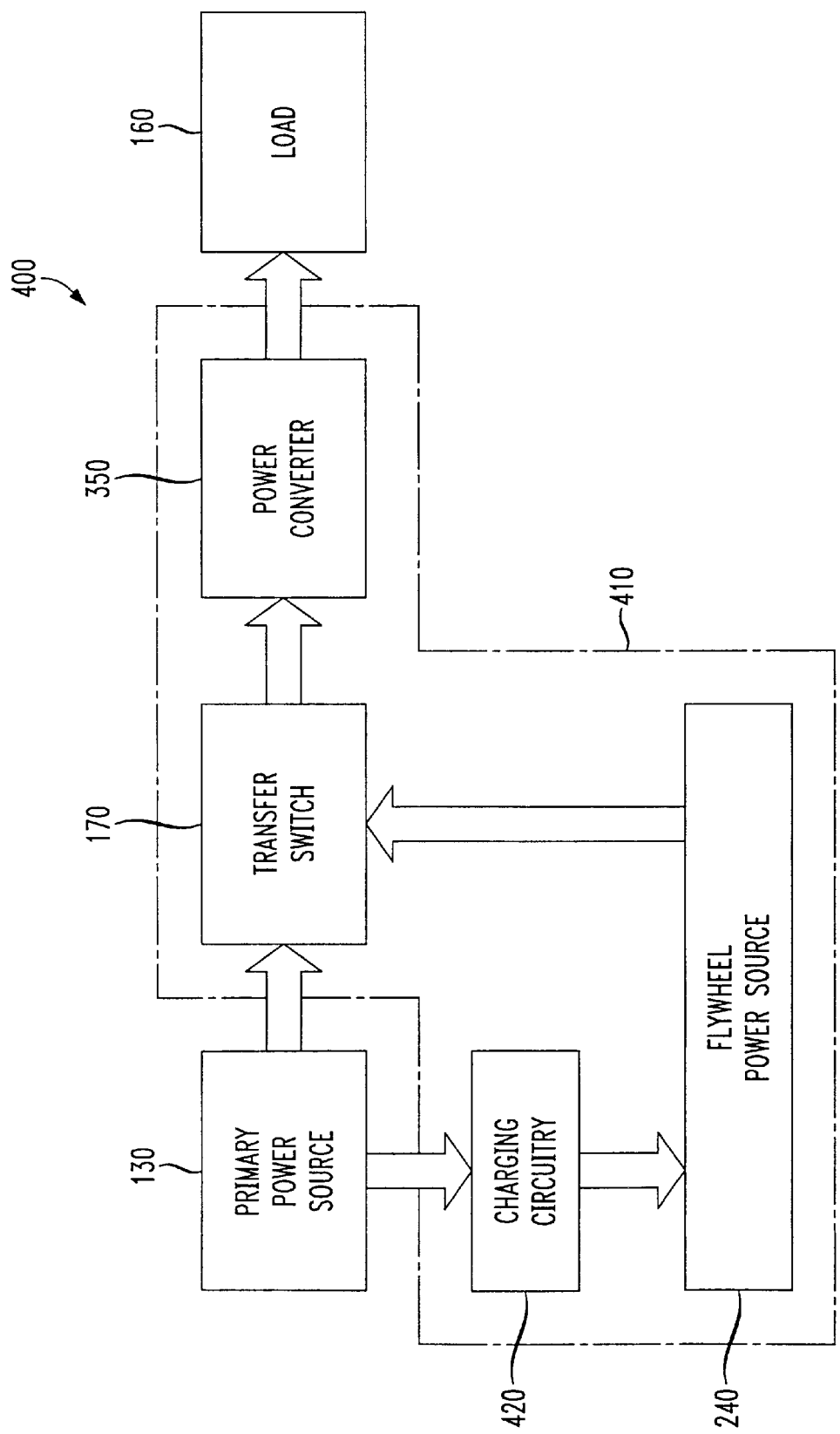
FIG. 4 illustrates a block diagram of a telecommunications installation employing a second embodiment of a hybrid standby power system, constructed according to the principles of the present invention, in which a flywheel is employed as a standby power source.

Turning now to FIG. 4, illustrated is a block diagram of a telecommunications installation 400 employing a second embodiment of a hybrid standby power system 410, constructed according to the principles of the present invention, in which a flywheel is employed as a standby power source. The hybrid standby power system 410 is identical to that illustrated in FIG. 3 with the exception that the standby power system 310 employs a flywheel power source 240 as a standby power source; charging circuitry 420 is provided to control the charging of the flywheel power source. In addition, the power converter 350 is designed to accept unregulated AC input voltages over a range of frequencies that includes the normal operating frequencies of both the primary power source 130 and the flywheel power source 240. For example, if the primary power source 130 is a commercial utility operating at 60±5 Hz and the flywheel power source 240 has an output frequency that varies from 3000 to 1500 Hz, the power converter 350 is preferably designed to operate over an input frequency range of 55 to 3000 Hz.

During normal operation of the hybrid standby power system 410, the transfer switch 170 couples the primary power source 130, such as a commercial utility, to the input of the power converter 350; the charging circuitry 420 also receives electrical power from the primary power source 130, which is used to charge the flywheel power source 240. If the primary power source 130 fails, the transfer switch 170 decouples the primary power source 130 from the input of the power converter 350 and directly couples the output of the flywheel power source to the power converter 350. Thus, by designing the power converter 350 to operate over a much wider input operating range than a conventional power converter, the hybrid standby power system 410 has the advantage of not requiring a power conditioner for the output of the flywheel power source 240.

Figure 5:
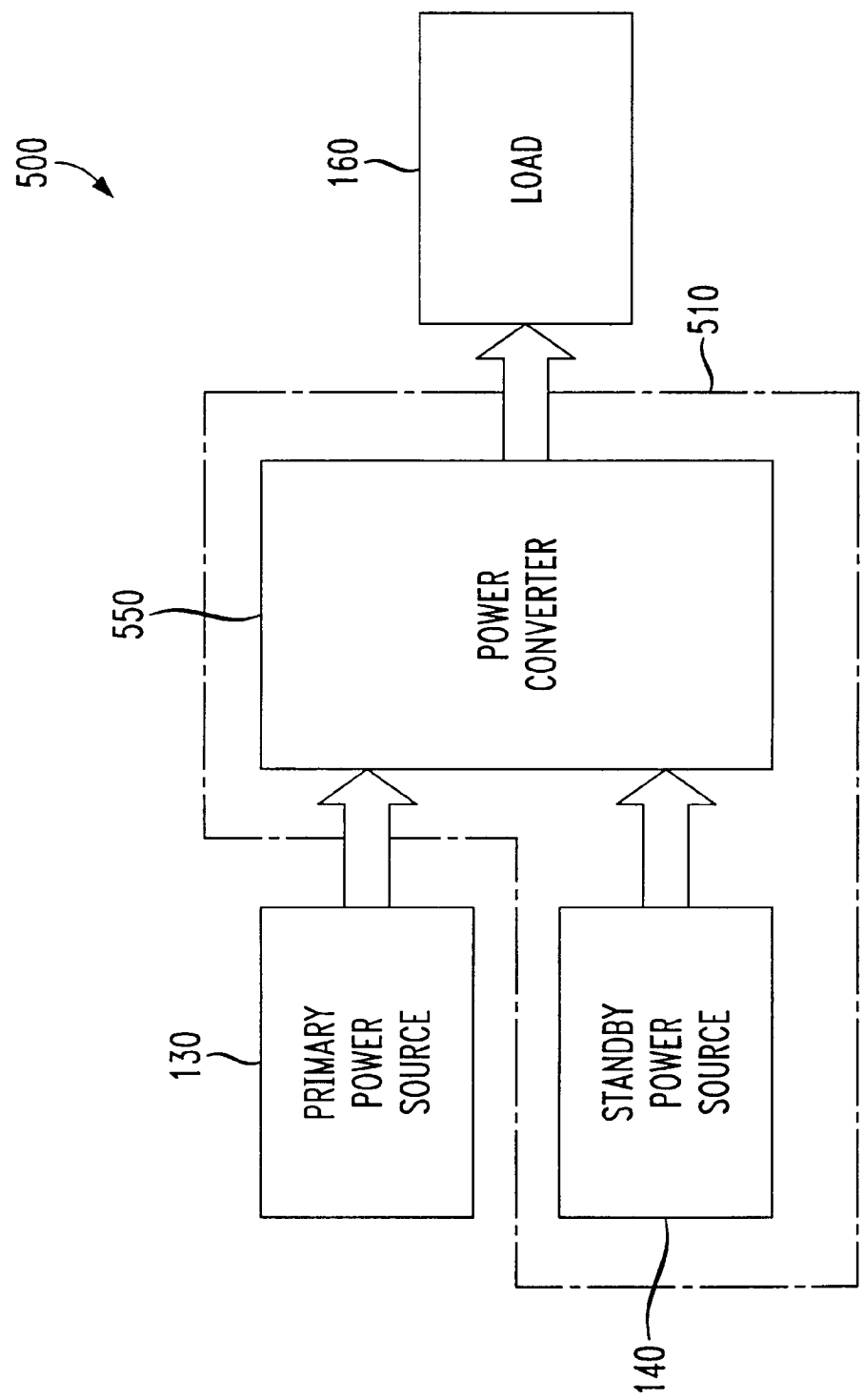
FIG. 5 illustrates a telecommunications installation employing a block diagram of a third embodiment of a hybrid standby power system, constructed according to the principles of the present invention, in which a power converter is provided with dual isolated inputs for accepting power concurrently from primary and standby power sources.

Turning now to FIG. 5, illustrated is a block diagram of a telecommunications installation 500 employing third embodiment of a hybrid standby power system 510, constructed according to the principles of the present invention, in which a dual input power converter 550, described more fully hereinafter, is provided with isolated inputs for accepting power concurrently from primary and standby power sources. During normal operation of the hybrid standby power system 510, both the primary power source 130, such as a commercial utility, and the standby power source 140 are directly coupled to the dual isolated inputs of the power converter 550, whereby the power converter 550 can receive power concurrently from primary and standby power sources.

Because the standby power source 140 is always directly coupled to the power converter 550, via one of its dual isolated inputs, the need for a transfer switch to switch from a failed primary power source 130 to the standby power source 140 is eliminated. Thus, by designing the power converter 550 to operate over a much wider input operating range than a conventional power converter, the hybrid standby power system 510 has the advantage of not requiring a transfer switch or a power conditioner for the output of the standby power source 140. Those skilled in the art will recognize that the dual input power converter 550 may be used in the hybrid standby power system 410, illustrated in FIG. 4, to eliminate the transfer switch 170 required when using the single input power converter 350.

Figure 6:
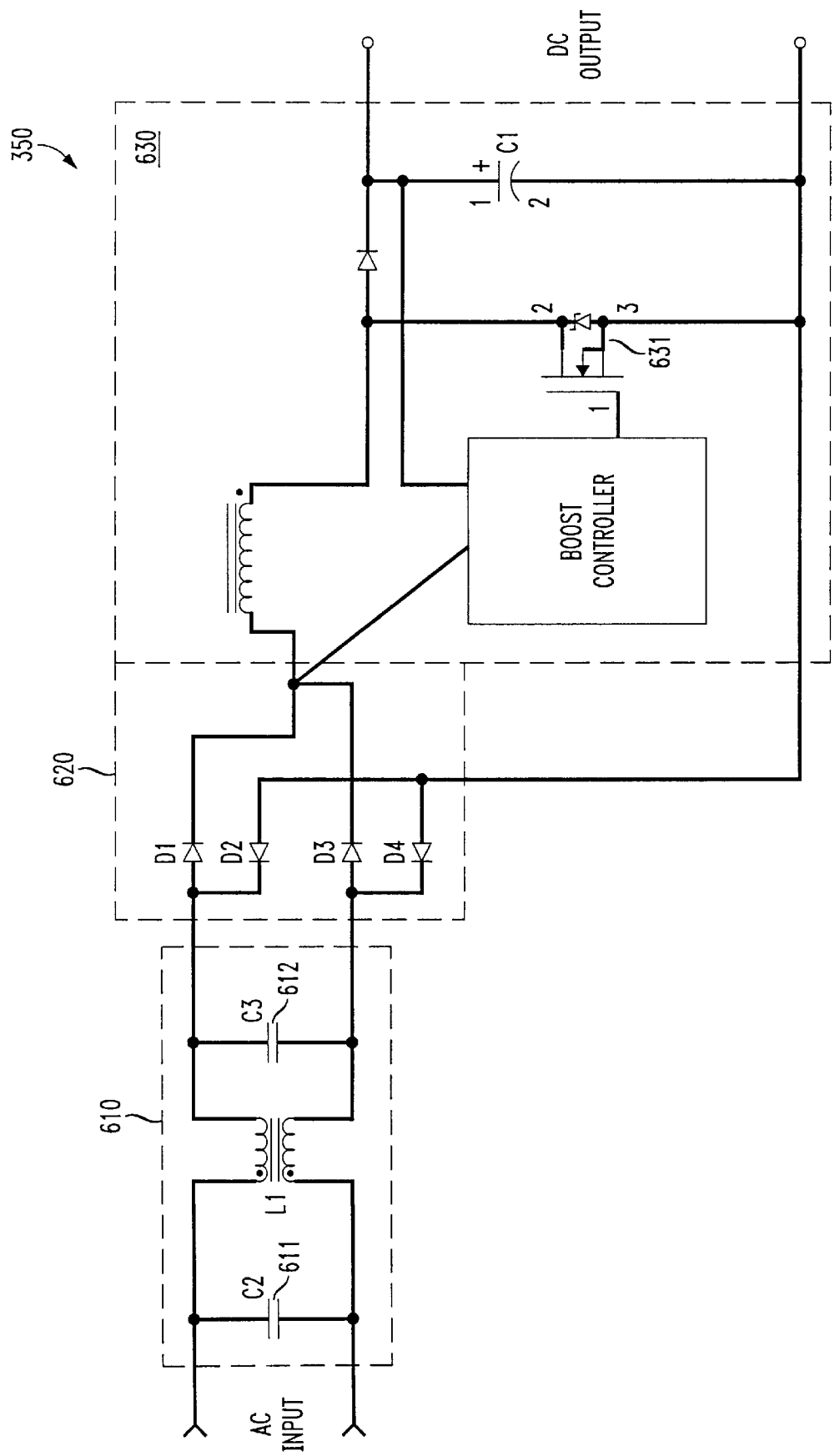
FIG. 6 illustrates an exemplary power converter adapted for use in the hybrid standby power system of the present invention.

Turning now to FIG. 6, illustrated is an exemplary power converter 350 adapted for use in a hybrid standby power system constructed in accordance with the principles of the present invention, such as those illustrated in FIGS. 3 and 4. The power converter 350 has a single AC input to an electromagnetic interference ("EMI") filter 610. The EMI filter 610 is provided to prevent noise generated by the power converter from being coupled back onto the AC input lines. The capacitors 611 and 612 of the EMI filter 610 must be capable of handling frequencies over the range of frequencies of both the primary and standby power source; for example, if the standby power source is a flywheel, as described hereinabove, the capacitors 611 and 612 must handle frequencies from 55 to 3300 Hz. In particular, the EMI filter 610 should be designed to avoid resonances in the range of output frequencies of the standby power source. The principles of the present invention are not limited to a specific EMI filter design; those skilled in the art are familiar with the design of conventional EMI filters, all such filters being within the scope of the claims recited hereinafter.

The power converter 350 further includes a rectifier circuit 620 that rectifies the voltage at the AC input, i.e., either the primary or standby power source, to provide unregulated DC electrical power to a DC—DC converter 630. Although a passive rectifier is illustrated in the exemplary power converter 350, an active rectifier circuit may be substituted therefore; e.g., one or more of the diodes in the rectifier circuit 620 may be replaced by a silicon-controlled rectifier ("SCR"), or similar device, to achieve a controlled turn-on.

The DC—DC converter 630 illustrated in FIG. 6 is a boost converter which includes a switch 631 controlled by a boost controller 632. The boost controller senses the input voltage and the output voltage and/or current and alternately activates the switch 631 as a function thereof to regulate the DC output voltage. Those skilled in the art are familiar with the design and operation of DC—DC converters, including boost converters; the principles of the present invention are not limited, however, to a particular type of converter, all such converters being within the scope of the claims recited hereinafter, including DC-to-DC and DC-to-AC converters.

The design of a conventional boost converter can be modified to accept input voltages ranging from DC to frequencies greater than 3000 Hz and still achieve a regulated DC output. Although the power factor correction capabilities of a conventional boost converter will likely be degraded for input frequencies above 100 Hz, unity power factor is not required when operating off a standby power source that generates a raw output voltage at other than a nominal 60 Hz. Therefore, there are no significant considerations weighing against the elimination of the power conditioner employed in conventional standby power systems.

Figure 7:
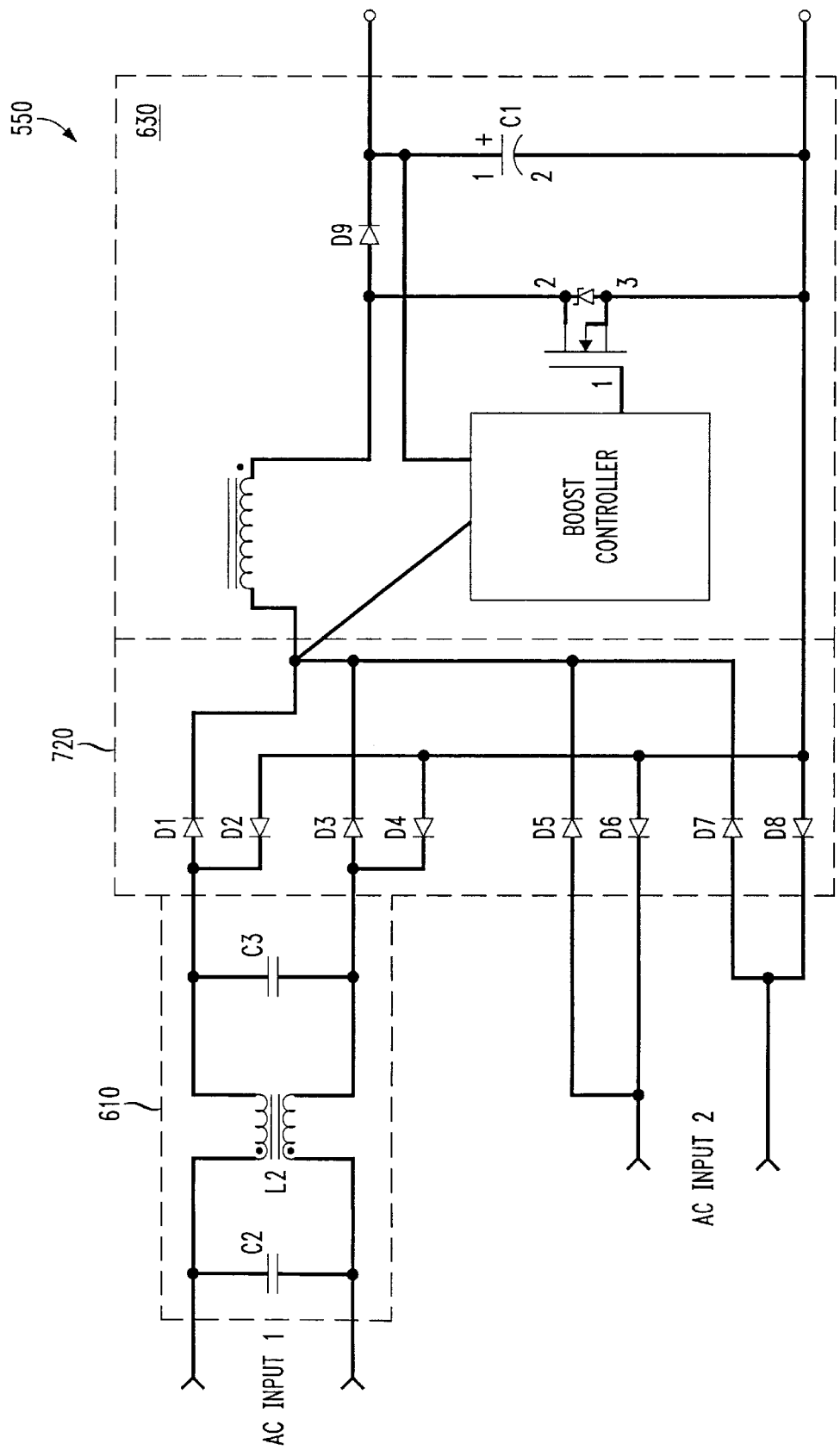
FIG. 7 illustrates an exemplary power converter, adapted for use in a hybrid standby power system of the present invention, having first and second mutually-isolated power inputs for receiving concurrently electrical power from primary and standby power sources.

Turning now to FIG. 7, illustrated is an exemplary power converter 550, adapted for use in a hybrid standby power system constructed in accordance with the principles of the present invention, such as that illustrated in FIG. 5. The power converter 550 includes first and second mutually-isolated power inputs for receiving concurrently electrical power from primary and standby power sources. One of the inputs to the power converter 550 is illustrated as having an EMI filter 610, described hereinabove. Although illustrated as having an EMI filter coupled to only one of the mutually-isolated inputs, those skilled in the art will recognize that either, both, or neither of the inputs may be provided with an EMI filter, all such embodiments being within the scope of the claims recited hereinafter.

The power converter 550 further includes a dual-input rectifier circuit 720 that can concurrently rectify the voltage at each AC input, e.g., both the primary and standby power sources, to continuously provide unregulated DC electrical power to the DC—DC converter 630, described with reference to FIG. 6. Thus, a hybrid standby power system employing the power converter 550 can not only eliminate the need for a separate power conditioner for the output of the standby power source, but the use of a dual-input rectifier circuit also eliminates the need for a transfer switch required when using only a single input circuit.

Although the present invention has been described in detail, those skilled in the art should understand that they can make various changes, substitutions and alterations herein without departing from the spirit and scope of the invention in its broadest form.

What is claimed is:

1. A hybrid standby power system for producing regulated DC electrical power, comprising:
   a primary power input, couplable to a primary power source, that accepts primary electrical power subject to interruption, said primary electrical power having an alternating current;
   a standby power input, couplable to a standby power source, that accepts unregulated standby electrical power having an alternating current with frequency greater than 60 hertz; and
   a power converter, couplable to at least one of said primary and standby power inputs, said power converter including a rectifier that rectifies at least one of said primary and standby electrical power to provide unregulated DC electrical power and a DC—DC converter that converts said unregulated DC electrical power into said regulated DC electrical power, said power converter not requiring a power conditioner external to said power converter.

2. The system as recited in claim 1 further comprising a transfer switch, coupled to said primary and standby power inputs and said power converter, that selectively couples one of said primary and standby power inputs to said power converter.

3. The system as recited in claim 1 wherein said power converter includes first and second mutually-isolated power inputs, said first power input coupled to said primary power input and said second power input coupled to said standby power input.

4. The system as recited in claim 1 wherein said standby electrical power is variable frequency.

5. The system as recited in claim 1 wherein said power converter further includes an electromagnetic interference (EMI) filter coupled to said rectifier.

6. The system as recited in claim 1 wherein said rectifier is a full-bridge diode rectifier.

7. The system as recited in claim 1 wherein said DC—DC converter is a boost converter.

8. A method of providing regulated DC electrical power, comprising the steps of:
   accepting primary electrical power from a primary power source, said primary electrical power subject to interruption and having an alternating current;
   accepting unregulated standby electrical power from a standby power source, said standby electrical power having an alternating current with frequency greater than 60 hertz;
   rectifying, with a rectifier, at least one of said primary and standby electrical power to provide unregulated DC electrical power; and
   converting, with a DC—DC converter, said unregulated DC electrical power into said regulated DC electrical power, said power converter not requiring a power conditioner external to said power converter.

9. The method as recited in claim 8 further comprising the step of selectively coupling one of said primary and standby power inputs to said power converter with a transfer switch coupled to said primary and standby power inputs and said power converter.

10. The method as recited in claim 8 wherein said power converter includes first and second mutually-isolated power inputs that receive said primary and standby electrical power, respectively.

11. The method as recited in claim 8 wherein said standby electrical power is variable frequency.

12. The method as recited in claim 8 further comprising the step of filtering said primary and standby electrical power in an electromagnetic interference (EMI) filter coupled to said rectifier.

13. The method as recited in claim 8 wherein said rectifier is a full-bridge diode rectifier.

14. The method as recited in claim 8 wherein said DC—DC converter is a boost converter.

15. A telecommunications installation, comprising:

a standby power source that produces unregulated standby electrical power having an alternating current with frequency greater than 60 hertz;

a hybrid standby power system for producing regulated DC electrical power, including:

a primary power input, couplable to a primary power source, that accepts primary electrical power subject to interruption, said primary electrical power having an alternating current, a standby power input, coupled to said standby power source, that accepts said unregulated standby electrical power, and a power converter, couplable to at least one of said primary and standby power inputs, said power converter including a rectifier that rectifies at least one of said primary and standby electrical power to provide unregulated DC electrical power and a DC—DC boost converter that converts said unregulated DC electrical power into said regulated DC electrical power, said power converter not requiring a power conditioner external to said power converter; and telecommunications equipment, coupled to said power converter, that accepts and is powered by said regulated DC electrical power.

16. The installation as recited in claim 15 wherein said system further includes a transfer switch, coupled to said primary and standby power inputs and said power converter, that selectively couples one of said primary and standby power inputs to said power converter.

17. The installation as recited in claim 15 wherein said power converter includes first and second mutually-isolated power inputs, said first power input coupled to said primary power input and said second power input coupled to said standby power input.

18. The installation as recited in claim 15 wherein said standby electrical power is variable frequency.

19. The installation as recited in claim 15 wherein said power converter further includes an electromagnetic interference (EMI) filter coupled to said rectifier.

20. The installation as recited in claim 15 wherein said rectifier is a full-bridge diode rectifier.

* * * * *